United States Patent
Liu et al.

(10) Patent No.: US 10,073,672 B2
(45) Date of Patent: Sep. 11, 2018

(54) METHOD, SYSTEM, AND COMPUTER STORAGE MEDIUM FOR VOICE CONTROL OF A SPLIT-SCREEN TERMINAL

(71) Applicant: ZTE CORPORATION, Shenzhen, Guangdong Province (CN)

(72) Inventors: Lizhang Liu, Shenzhen (CN); Tao Xue, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/112,197

(22) PCT Filed: May 23, 2014

(86) PCT No.: PCT/CN2014/078324
§ 371 (c)(1),
(2) Date: Jul. 18, 2016

(87) PCT Pub. No.: WO2015/106515
PCT Pub. Date: Jul. 23, 2015

(65) Prior Publication Data
US 2017/0192741 A1    Jul. 6, 2017

(30) Foreign Application Priority Data
Jan. 20, 2014    (CN) .......................... 2014 1 0026098

(51) Int. Cl.
*H03G 3/00*    (2006.01)
*G06F 3/16*    (2006.01)
*H04R 3/00*    (2006.01)

(52) U.S. Cl.
CPC ............... *G06F 3/165* (2013.01); *H04R 3/00* (2013.01); *H04R 2499/11* (2013.01)

(58) Field of Classification Search
CPC ........ G06F 3/165; H04R 3/00; H04R 2499/11
See application file for complete search history.

(56) References Cited

U.S. PATENT DOCUMENTS

| | | |
|---|---|---|
| 2010/0293468 A1 | 11/2010 | Thijssen |
| 2013/0139061 A1 | 5/2013 | Strode et al. |
| 2014/0059549 A1* | 2/2014 | Li .............................. G06F 9/44 718/100 |
| 2014/0307896 A1* | 10/2014 | Park ........................ G06F 3/165 381/119 |
| 2016/0066119 A1* | 3/2016 | Wu ........................... H04S 7/30 381/303 |
| 2016/0147496 A1* | 5/2016 | Lee ......................... H04N 5/45 345/1.3 |

FOREIGN PATENT DOCUMENTS

| | | |
|---|---|---|
| CN | 1582425 A | 2/2005 |
| CN | 102455888 A | 5/2012 |
| GB | 2495270 A | 4/2013 |

* cited by examiner

*Primary Examiner* — Andrew L Sniezek
(74) *Attorney, Agent, or Firm* — Ling Wu; Stephen Yang; Ling and Yang Intellectual Property

(57) ABSTRACT

The embodiments of the present document provide a method and system for performing sound control on a split-screen terminal, and a computer storage medium. The method includes: establishing a sound connection channel for each application displayed in a split-screen manner; and determining an application on which sound control is to be performed and performing sound control on the application through the sound connection channel.

7 Claims, 2 Drawing Sheets

```
S101: Establish a sound connection channel with each application displayed in a split-screen manner S102: Determine an application on which sound control is to be performed and perform sound control on the application through the sound connection channel
```

ND, SYSTEM, AND COMPUTER STORAGE MEDIUM FOR VOICE CONTROL OF A SPLIT-SCREEN TERMINAL

TECHNICAL FIELD

The present document relates to the field of terminal sound control, in particular to a method and a system for performing sound control on a split-screen terminal and a computer storage medium.

BACKGROUND OF THE RELATED ART

With the continuous enrichment of smart mobile terminal applications, simultaneously performing multitasking has already become a basic function of smart mobile terminals. Although a background of a smart mobile terminal can simultaneously process multiple tasks, what is displayed to a user at the foreground via a screen is usually only one application interface. For example, when the user views a video through the smart mobile terminal, and if the user also wants to interact with other people through an instant messaging application, the user can only switch from a current video playing interface to an instant messaging application interface.

With the continuous upgrading of hardware of the smart mobile phones, a split-screen function starts to appear on the smart mobile terminals. The smart mobile terminals which support the split-screen function can simultaneously display a plurality of running application interfaces on one screen, which is convenient for the operation of the user.

However, the related smart mobile terminals still perform volume control uniformly on a plurality of applications displayed on the screen under the split-screen function, the user demand of separately performing volume control on the designated applications cannot be satisfied, and conflicts between sounds of the plurality of applications are easily caused.

SUMMARY

The embodiments of the present document provides a method and a system for performing sound control on a split-screen terminal and a computer storage medium, so as to solve the technical problem how to separately process sounds of applications displayed on the terminal in a split-screen manner.

In order to solve the technical problem, the embodiment of the present document provides a method for performing sound control on a split-screen terminal. The method comprises:

establishing a sound connection channel for each application displayed in a split-screen manner; and determining an application on which sound control is to be performed and performing sound control on the application through the sound connection channel.

Preferably, the determining an application on which sound control is to be performed and performing sound control on the application through the sound connection channel comprises:

after receiving a sound control instruction, if that the control instruction does not designate an application is judged, determining an application running in a focus window of a screen; and performing sound control on the application through the sound connection channel corresponding to the application running in the focus window.

Preferably, the determining the application on which sound control is to be performed and performing sound control on the application through the sound connection channel comprises:

after receiving a sound control instruction, if that the control instruction designates an application is judged, performing sound control on the designated application through the sound connection channel corresponding to the designated application.

Preferably, performing sound control on the application through the sound connection channel comprises:

when sound control is performed to turn on a sound, transmitting a sound signal, received from the sound connection channel corresponding to the application on which sound control needs to be performed, to a sound output device; and when sound control is performed to turn off a sound, shielding a sound signal, received from the sound connection channel corresponding to the application on which sound control needs to be performed, from the sound output device.

Preferably, the performing sound control on the application through the sound connection channel comprises:

when sound control is performed to switch a sound output device, shielding a sound signal, received from the sound connection channel corresponding to the application on which sound control needs to be performed, from the current sound output device, and transmitting the received sound signal to the sound output device to be switched.

In order to solve the technical problem, the embodiment of the present document further provides a system for performing sound control on a split-screen terminal. The system comprises a sound connection channel establishment module and an application sound control module, wherein the sound connection channel establishment module is configured to establish a sound connection channel for each application displayed in a split-screen manner; and the application sound control module is configured to determine an application on which sound control is to be performed and perform sound control on the application through the sound connection channel.

Preferably, the application sound control module being configured to determine an application on which sound control is to be performed and perform sound control on the application through the sound connection channel, comprises:

after receiving a sound control instruction, if that the control instruction does not designate an application is judged, determining an application running in a focus window of a screen; and performing sound control on the application through the sound connection channel corresponding to the application running in the focus window.

Preferably, the application sound control module being configured to determine the application on which sound control is to be performed and perform sound control on the application through the sound connection channel, comprises:

after receiving a sound control instruction, if that the control instruction designates an application is judged, performing sound control on the designated application through the sound connection channel corresponding to the designated application.

Preferably, the application sound control module being configured to perform sound control on the application through the sound connection channel, comprises:

when sound control is performed to turn on a sound, transmitting a sound signal, received from the sound connection channel corresponding to the application on which sound control needs to be performed, to a sound output device; and when sound control is performed to turn off a sound, shielding a sound signal, received from the sound connection channel corresponding to the application on which sound control needs to be performed, from a sound output device.

Preferably, the application sound control module being configured to perform sound control on the application through the sound connection channel, comprises:

when sound control is performed to switch a sound output device, shielding a sound signal, received from the sound connection channel corresponding to the application on which sound control needs to be performed, from a current sound output device, and transmitting the received sound signal to the sound output device to be switched to.

The embodiment of the present document further provides a computer storage medium, wherein, computer executable instructions are stored in the computer storage medium, and the computer executable instructions are set to execute any one of the above-mentioned methods of performing sound control on the split-screen terminal.

By establishing the sound connection channel for each application displayed in the split-screen manner, the technical solution provides a possibility of realizing separate processing of split-screen application sound on the terminal.

PREFERRED EMBODIMENTS

The embodiments of the present document will be described below in detail in combination with the drawings. Under the situation of no conflict, the embodiments in the present application and the features in the embodiments can be freely combined.

Figure 1:
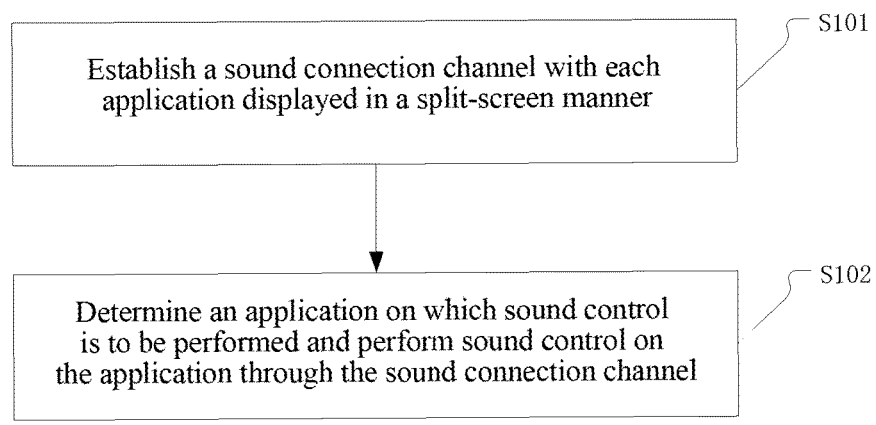
FIG. 1 is a flowchart of a method for performing sound control on a split-screen terminal according to the embodiment.

FIG. 1 is a flowchart of a method for performing sound control on a split-screen terminal according to the embodiment.

In S101, a sound connection channel is established for each application displayed in a split-screen manner.

In S102, it is to determine an application on which sound control is to be performed and a sound control is performed on the determined application through the sound connection channel.

The method of determining the application on which sound control is to be performed may include: after receiving a sound control instruction, if that the control instruction does not designate an application is judged, an application running in a focus window of the screen is determined; and the sound control is performed on the application through the sound connection channel corresponding to the application running in the focus window. And if it is judged that the control instruction designates an application, the sound control is performed on the designated application through the sound connection channel corresponding to the designated application.

The sound control includes adjusting a volume, turning on/off a sound and switching a sound output device.

When the sound control is performed to turn on a sound, a sound signal, received from the sound connection channel corresponding to the application on which the sound control needs to be performed, is transmitted to a sound output device. When the sound control is performed to turn off a sound, a sound signal, received from the sound connection channel corresponding to the application on which the sound control needs to be performed, is shielded from a sound output device. When the sound control is performed to switch a sound output device, a sound signal, received from the sound connection channel corresponding to the application on which the sound control needs to be performed, is shielded from the current sound output device, and the received sound signal is transmitted to the sound output device to be switched.

In the embodiment, when sounds of two or more than two split-screen applications are in a turned-on state, sounds output from the sound output device are mixed sounds of a plurality of sounds.

The embodiment will be further described below through application examples.

Application Example 1

A sound control instruction given by a user through a sound volume adjusting key on a mobile phone is received and the sound volume adjustment is performed on a split-screen application.

In step 1, a sound volume adjustment instruction is received and it is judged that the sound volume adjustment instruction does not designate any split-screen application;

In step 2, an application running in a focus window of a screen is recognized, herein the focus window refers to a window currently positioned by a cursor;

In step 3, an established sound connection channel is found, which corresponds to the application running in the focus window;

In step 4, a volume of sound data received from the sound connection channel is adjusted, and the adjusted sound data are output through a sound output device.

Application Example 2

A sound control instruction given by a user through a sound adjusting touch key on an application interface is received and sound volume adjustment is performed on a split-screen application.

In step 1, a sound volume adjustment instruction is received and it is judged that the sound volume adjustment instruction is given by an application 1;

In step 2, an established sound connection channel corresponding to the application 1 is found;

In step 3, a volume of sound data received from the sound connection channel is adjusted, and the adjusted sound data are output through a sound output device.

Application Example 3

Figure 2:
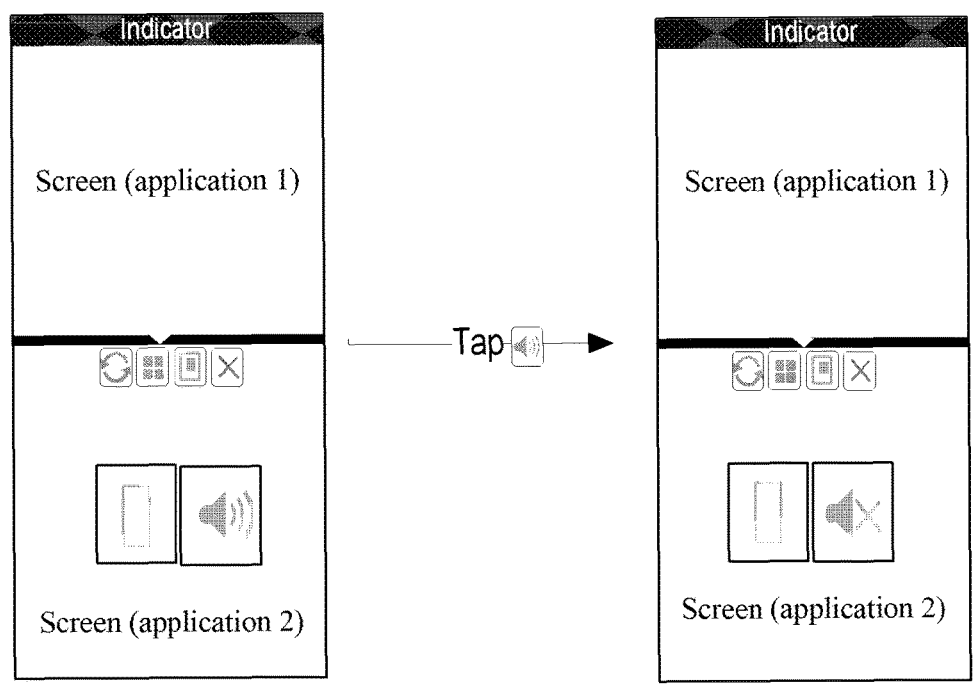
FIG. 2 is a schematic diagram of performing sound turning-off control on a split-screen application interface according to the application example.

A sound control instruction given by a user through a sound turning-on/off touch key on an application interface is received and sound turning-off control is performed on a split-screen application, as shown in FIG. 2.

In step 1, a sound turning-off instruction is received in a turned-on state of a sound switch, and it is judged that the sound turning-off instruction is given by an application 2;

In step 2, an established sound connection channel corresponding to the application 2 is found;

In step 3, a sound signal, received from the sound connection channel corresponding to the application 2, is shielded from a sound output device.

Application Example 4

Figure 3:
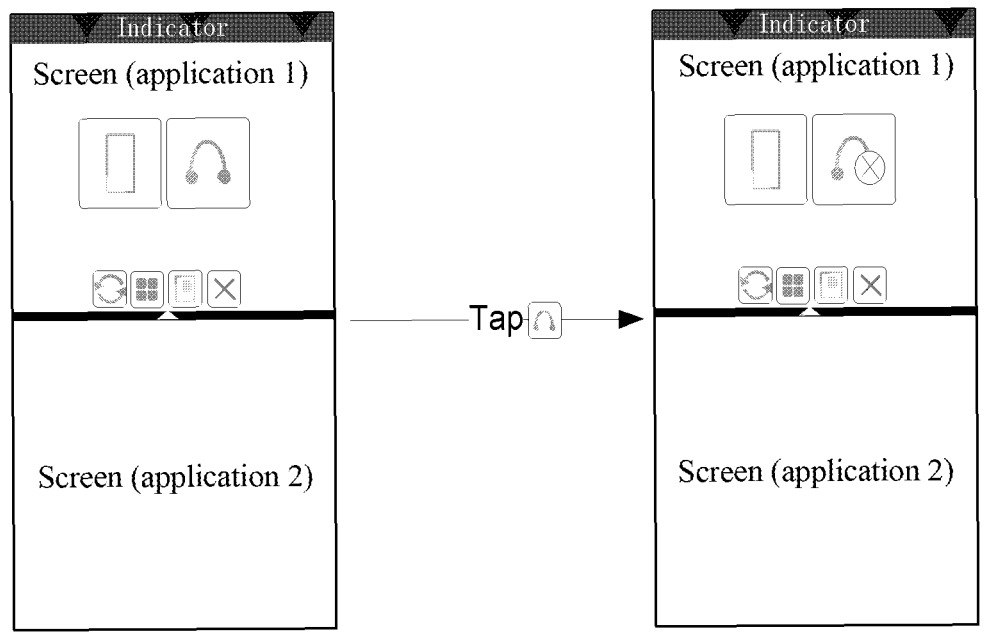
FIG. 3 is a schematic diagram of switching sound output from an earphone to a loudspeaker on a split-screen application interface according to the application example.

A sound control instruction given by a user through a "Hands-free" touch key on an application interface, and sound output of a split-screen application is switched from an earphone to a loudspeaker, as shown in FIG. 3.

In step 1, a "Hand-free" sound output instruction is received in an earphone sound output state in which sound is output, it is judged that the sound output device switching instruction is given by an application 1;

In step 2, an established sound connection channel corresponding to the application 1 is found;

In step 3, a sound signal, received from the sound connection channel corresponding to the application 1, is shielded from an earphone, and the received sound signal is transmitted to a loudspeaker.

Figure 4:
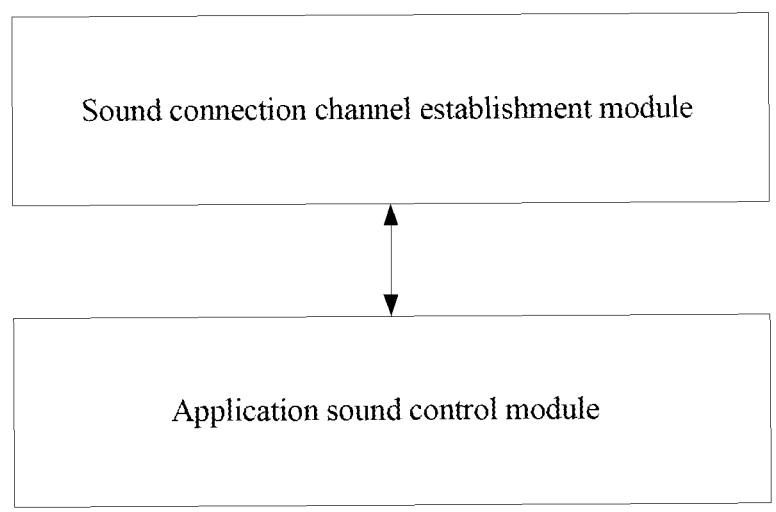
FIG. 4 is a component diagram of a system for performing sound control on a split-screen terminal according to the embodiment.

FIG. 4 is a composition diagram of a system for performing the sound control on a split-screen terminal according to the embodiment.

The system includes a sound connection channel establishment module and an application sound control module, herein the sound connection channel establishment module is configured to establish a sound connection channel for each application displayed in a split-screen manner;

the application sound control module is configured to determine an application on which the sound control is to be performed and perform the sound control on the application through the sound connection channel;

the application sound control module is configured to, after receiving a sound control instruction, if that the control instruction does not designate an application is judged, determine an application running in a focus window of the screen; and perform the sound control on the application through the sound connection channel corresponding to the application running in the focus window; and if that the control instruction designates an application is judged, perform the sound control on the application through the designated sound connection channel corresponding to the designated application;

when the sound control is performed to turn on a sound, the application sound control module is configured to transmit a sound signal, received from the sound connection channel corresponding to the application on which the sound control needs to be performed, to a sound output device; and when the sound control is performed to turn off a sound, the application sound control module is configured to shield a sound signal, received from the sound connection channel corresponding to the application on which the sound control needs to be performed, from a sound output device; and when the sound control is performed to switch a sound output device, the application sound control module shields a sound signal, received from the sound connection channel corresponding to the application on which the sound control needs to be performed, from the current sound output device, and transmits the received sound signal to the sound output device to be switched.

The embodiment of the present document further provides a computer storage medium, herein, computer executable instructions are stored in the computer storage medium, and the computer executable instructions are set to execute any one of the above-mentioned methods of performing the sound control on the split-screen terminal.

One ordinary person skilled in the art can understand that all or partial steps in the above-mentioned methods can be completed by relevant hardware instructed by a program, and the program can be stored in a computer readable storage medium such as a read only memory, a magnetic disk or a compact disk, etc. Alternatively, all or partial steps of the above-mentioned embodiments can also be implemented by using one or more integrated circuits. Correspondingly, each module/unit in the above-mentioned embodiments can be implemented by means of hardware, and can also be implemented by means of a software function module. The embodiments of the present document are not limited to combinations of hardware and software in any specific form.

The present document may also have other embodiments. One skilled in the art can make various corresponding modifications and variations according to the embodiments of the present document without departing from the rule and essence of the embodiments of the present document. However, all these corresponding modifications and variations shall also fall into the protection scope of claims appended to the embodiments of the present document.

INDUSTRIAL APPLICABILITY

By establishing the sound connection channel for each application displayed in a split-screen manner, the technical solution provides a possibility of realizing separate processing of split-screen application sound on the terminal.

What is claimed is:

1. A method for performing sound control on a split-screen terminal, the method comprising:
    establishing a sound connection channel for each application displayed in a split-screen manner; and
    determining an application on which a sound control operation is to be performed and performing the sound control operation to control sound generated from the determined application through the sound connection channel corresponding to the determined application;
    wherein, determining an application on which the sound control operation is to be performed and performing the sound control operation to control sound generated from the determined application through the sound connection channel corresponding to the determined application comprises:
    after receiving a sound control instruction, and if judging that the sound control instruction does not designate an application, determining an application running in a focus window of a screen as the application on which the sound control operation is to be performed; and
    performing a sound control operation corresponding to the sound control instruction to control the sound generated from the application through a sound connection channel corresponding to the application running in the focus window.

2. The method according to claim 1, wherein, the performing the sound control operation to control the sound generated from the determined application through the sound connection channel corresponding to the determined application comprises:

when the sound control operation is performed to turn on a sound, transmitting a sound signal, received from a sound connection channel corresponding to an application on which the sound control operation needs to be performed, to a sound output device; and when the sound control operation is performed to turn off a sound, shielding a sound signal, received from the sound connection channel corresponding to the application on which the sound control operation needs to be performed, from the sound output device.

3. The method according to claim 1, wherein, the performing the sound control operation to control the sound generated from the determined application through the sound connection channel corresponding to the determined application comprises:

when the sound control operation is performed to switch a sound output device, shielding a sound signal, received from a sound connection channel corresponding to an application on which the sound control operation needs to be performed, from a current sound output device, and transmitting the received sound signal to a sound output device to be switched to.

4. A non-transitory computer storage medium, computer executable instructions being stored in the non-transitory computer storage medium, the computer executable instructions being set to execute the methods of performing sound control on a split-screen terminal according to claim 1.

5. A system for performing sound control on a split-screen terminal, the system comprising a sound connection channel establishment module and an application sound control module, wherein, the sound connection channel establishment module is configured to establish a sound connection channel for each application displayed in a split-screen manner; and the application sound control module is configured to determine an application on which a sound control operation is to be performed and perform the sound control operation to control sound generated from the determined application through the sound connection channel corresponding to the determined application;

wherein, the application sound control module is configured to determine an application on which the sound control operation is to be performed and perform the sound control operation to control the sound generated from the determined application through the sound connection channel corresponding to the determined application, comprising:

after receiving a sound control instruction, if judging that the sound control instruction does not designate an application, determining an application running in a focus window of a screen as the application on which the sound control operation is to be performed; and performing a sound control operation corresponding to the sound control instruction to control the sound generated from the application through a sound connection channel corresponding to the application running in the focus window.

6. The system according to claim 5, wherein, the application sound control module is configured to perform the sound control operation to control the sound generated from the determined application through the sound connection channel corresponding to the determined application, comprising:

when the sound control operation is performed to turn on a sound, transmitting a sound signal, received from a sound connection channel corresponding to an application on which the sound control operation needs to be performed, to a sound output device; and when the sound control operation is performed to turn off a sound, shielding a sound signal, received from the sound connection channel corresponding to the application on which the sound control operation needs to be performed, from the sound output device.

7. The system according to claim 5, wherein, the application sound control module is configured to perform the sound control operation to control the sound generated from the determined application through the sound connection channel corresponding to the determined application, comprising:

when the sound control operation is performed to switch a sound output device, shielding a sound signal, received from a sound connection channel corresponding to an application on which the sound control operation needs to be performed, from a current sound output device, and transmitting the received sound signal to a sound output device to be switched to.

* * * * *